United States Patent Office.

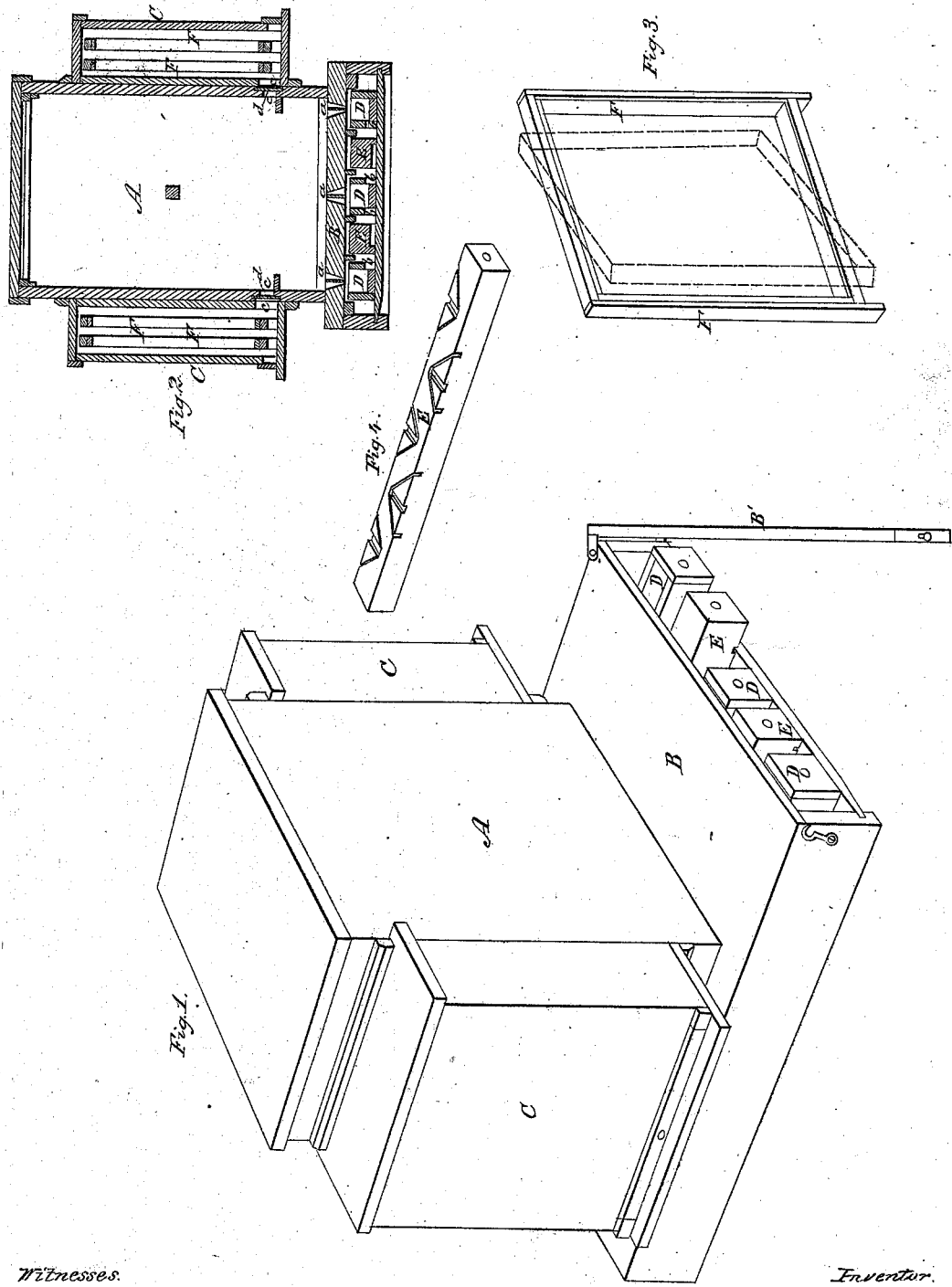

H. H. FLICK, OF LAVANSVILLE, PENNSYLVANIA.

Letters Patent No. 95,100, dated September 21, 1869; antedated September 8, 1869.

IMPROVEMENT IN BEE-HIVES.

The Schedule referred to in these Letters Patent and making part of the same.

*To all whom it may concern:*

Be it known that I, H. H. FLICK, of Lavansville, county of Somerset, and State of Pennsylvania, have invented a new and useful Improvement in Bee-Hives; and I do hereby declare that the following is a clear, full, and exact description thereof, reference being had to the accompanying drawings, in which—

Figure 1 is a perspective view.

Figure 2 is a vertical section through the main hive and the side boxes.

Figure 3 is a perspective view of the double frame.

Figure 4 is a perspective view of the moth-trap, bottom side up.

To enable others skilled in the art to make and use my invention, I will proceed to describe its construction and operation.

The main hive, A, is placed upon a hollow platform, B. In the top of the platform B are openings, a. Under these openings, inside of the hollow platform, are drawers, D, which have, in their sides, one or more openings, b. Between the drawers D are placed the moth-traps E. On the sides of the main hive A are placed the honey-boxes C, inside of which is placed the desired number of frames F, which are made double, that is, one inside of another. Between the hive A and boxes C, are openings, c, in which are slides, d. The entrance for the bees is at the bottom of one side of the hive A.

The moth-trap E is made of a solid piece, with grooves, of any desired form, cut in the under side, as seen in fig. 4.

The drawers D and moth-traps E slide freely in the platform B, the end of which is closed by a door, B'. The bees enter the boxes C through the openings c, which can be opened or shut at pleasure, by means of the slides d.

When the frames F are filled with honey, they can be removed from the box C by removing the top of the box, and the inside frame is then removed from the outer one, and another one put in its place, and the frame then returned to the box C.

The openings a, in the top of the platform B, are to allow the dirt, dead bees, &c., to fall from the hive into the drawers D, which can be removed at pleasure. The moths will take shelter in the grooves in the trap E, which can be drawn out at any time, by which operation the moths will be removed from the hives, and can then be destroyed.

The openings b, in the sides of the drawers D, are for the purpose of allowing the moths or grub to get into the traps E.

I do not claim, broadly, the construction of double honey-frames, for the purpose herein specified, as I am aware that double honey-frames have been used before, and are shown in the patent of Andrew H. Frank, dated December 27, 1864; but having fully described my invention,

What I claim as new therein, and desire to secure by Letters Patent, is—

1. The double honey-frame F, when constructed and arranged as herein shown and described.

2. The combination of the moth-trap E with the base B, having the door B', when arranged in the manner and for the purpose herein shown and described.

H. H. FLICK.

Witnesses:
J. O. KIMMEL,
MAHLON MILLER.